March 9, 1965  G. R. KERN, JR  3,172,676
COLLET CHUCK
Filed March 7, 1962
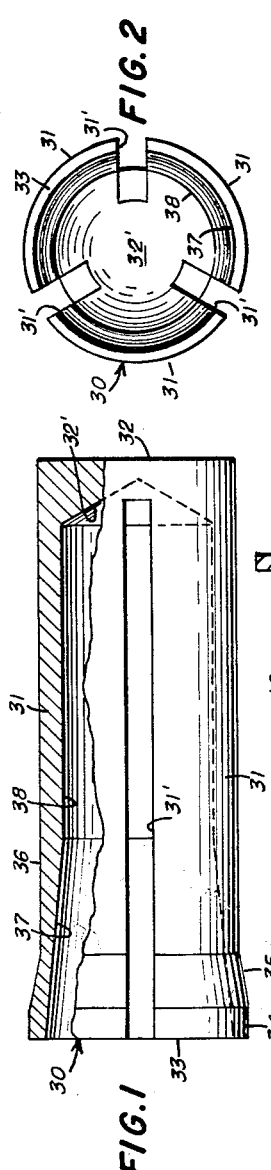
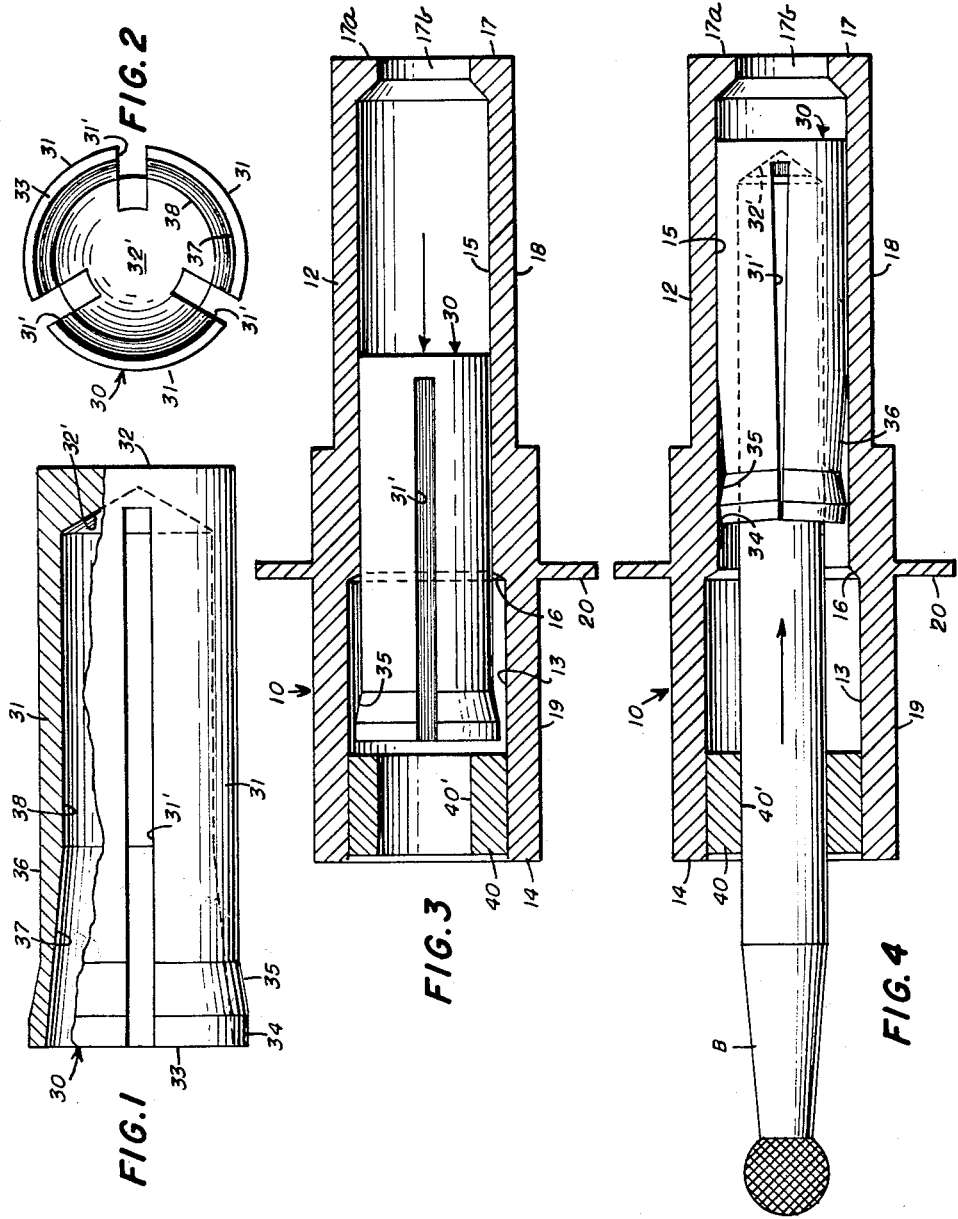
INVENTOR
*GEORGE ROBERT KERN, JR.*
BY *Beale and Jones*
ATTORNEYS United States Patent Office 3,172,676
Patented Mar. 9, 1965

3,172,676
COLLET CHUCK
George R. Kern, Jr., Herndon, Va., assignor, by mesne assignments, to Densco Incorporated, Denver, Colo., a corporation of Colorado
Filed Mar. 7, 1962, Ser. No. 178,061
2 Claims. (Cl. 279—51)

This invention relates to an improved collet chuck that grasps a cutting tool by movement of the collet in one direction and releases it by reverse movement.

It is an object of my invention to provide a simple releasable securement of a burr or cutting tool within a hollow rotatable driven shaft.

Another object of the invention is to provide a three piece collet chuck operable without threaded portions.

A further object of the invention is to provide a collet chuck which tightens the grasp on the drill member on the axial inserting movement of same and release the grasp by reverse axial movement without the use of wrenches.

A still further object is to provide a highly efficient replacement for the plastic sleeve now used to hold dental burrs in dental handpieces whereby axial alignment is assured with repeated usage.

Yet a further object of the invention is to provide a collet chuck that does not require a holding device or devices to prevent shaft rotation for grasping and releasing a cutting instrument.

Still further objects and the entire scope of applicability of the present invention will become apparent from the detailed description given hereinafter. It should be understood, however, that the detailed description and specific example is given by way of illustration only and, while indicating preferred embodiment of the invention, is not given by way of limitation, since various changes and modifications within the spirit and scope of the invention will become apparent to those skilled in the art from this detailed description.

For a more complete understanding of the nature and scope of my invention, reference is had to the drawings and description which follows in which;

FIG. 1 is a side elevational view of the collet member of the chuck with a portion broken away to show the internal surface configuration of one of the jaws;

FIG. 2 is an end view of the left hand end of the collet in FIG. 1;

FIG. 3 is a side elevational view of the chuck assembly showing the hollow shaft and collet captivating element in section and the collet with its jaws expanded ready to receive a cutting instrument; and FIG. 4 is a view similar to that of FIG. 3 but showing the chuck having received a cutting instrument and the collet slid into grasping position.

Throughout the description, like reference numbers refer to similar parts.

The whole chuck is generally indicated at 10 and is made up of a hollow shaft member 12 which slidably receives a collet 30 that is held captive therewithin by an annular guiding and captivating member 40.

The hollow shaft member 12 of the chuck may take various shapes externally but its internal shape comprises a first cylindrical recess 13 extending inward from open end 14 for about one-third its length, in the illustration shown, and a second cylindrical recess 15 of lesser diameter for the balance of the internal portion. The two cylindrical internal portions 13 and 15 are joined by a tapered transition portion 16 against which the jaws of the collet 30 will ride in assuming a grasping condition as will be explained.

The other end 17 of the hollow shaft 12 terminates in a radially and inwardly extending flange 17a that has an axial aperture 17b extending therethrough to receive a rigid pin (not shown) to slide the collet to released position as will be explained.

The outside of the hollow shaft 12 is for use in a dental handpiece that has a fluid drive turbine such as for example, as shown in U.S. Patent 2,937,444. The external cylindrical portion of reduced smaller diameter portion at 18 would receive the turbine rotor and a bearing member while the larger diameter portion 19 would receive another bearing against which the flange 20 would ride. Other uses could be made of this collet chuck assembly.

The collet 30 is made up of axially extending circumferentially spaced apart jaw members 31 which make up the generally cylindrical-like cavity to receive a cutting instrument such as the burr B here illustrated which has a cylindrical shank. The jaw members 31 extend nearly the whole length of the collet from its closed base end portion 32 and form a socket to receive the shank of the burr B. The inner surface 32' of the base end 32 is frusto conical shaped as indicated in FIGURES 1 and 4 and the inner end of the burr B rides thereadjacent when shoved all the way in. The outer end 33 of the jaws form a cylindrical circumferential portion 34 of the greatest diameter of the collet which extends axially for a relatively short distance where it joins with an inclined or tapered outer circumferential surface portion 35 that extends for a relatively short axial distance and joins a smaller diameter cylindrical circumferential portion 36 which extends for the balance and majority length of the collet.

The inner surface of the collet 30 comprises, starting at the outer end 33 of the jaws 31, a tapered internal surface portion 37 with greatest diameter of the outer end 33 and of an axial length of a little more than one-third the length of the jaws 31. The inner axial end of the tapered inner surface 37 joins with an internal cylindrical circumferential portion 38 which forms a socket to receive, guide and grasp the shank of the burr B or a similar cutting instrument.

The spaced apart jaws 31 have sufficient spacing in the slots 31' therebetween to permit their tightly grasping the shank of the burr B, see FIG. 3, when the burr is inserted into the collet 30 and pushed in the direction of the arrow in FIG. 4. As the burr seats in the bottom portion 32' of the collet 30, the outside tapered portion 35 strikes the internal tapered portion 16 of the hollow shaft and rides axially and the jaws 31 move radially inwardly. Following the movement on surface 35, the outer surface 34 rides on the portion 16 and then the inner portion 15 of the hollow shaft as the collet moves further axially inward within the hollow shaft 12.

The collet is held captivated within the hollow shaft 12 by the captivating element 40 which is of annular shape and fits snugly within the outer end 14 of the hollow shaft member 12. This may be held in by a press fit or may be otherwise secured as by a suitable adhesive. This internal cylindrical surface 40' of the element 40 also serves as a guidway and bearing surface support for the shank of the burr B. As the collet moves inward within the cylindrical portion 15 of the hollow shaft 12, it attains the position as shown in FIG. 4 wherein the outer surfaces 36 and 34 thereof slidably fit within the second cylindrical portion 15 of the hollow shaft and the shank of the bar is tightly grasped within the radially moved in jaws 31 wherein the inner tapered surface portion 37 and cylindrical portion 38 of the jaws 31 tightly grasp the shank of the burr B. The collet 30 is here shown as are the other parts on an enlarged scale. The size of the jaws 31 of the collet for a dental handpiece here shown is comparatively small and they are readily urged radially inward to tightly grasp the shank of burr B.

To release the burr B it is merely necessary to move the collet 30 in the reverse direction, i.e., to the left, and this is done by pressing the hollow shaft down over a pin that is received in the aperture 17b in its base 17. This pin, not shown, may be mounted to project vertically from a small base thus the handpiece carrying the hollow shaft is positioned over the pin part so that the pin is received within the aperture 17b at the anterior and turbine carrying end of the dental handpiece.

While use of this chuck in a dental handpiece has been referred to herein, many other uses can be had of a collet chuck constructed using these principles of construction and operation.

A collet chuck utilizing the principles of this invention is easily constructed and maintained. It is easily used without the use of wrenches, yet provides a tight grasp on a cutting instrument held in its jaws and provides for easy release also without the use of wrenches.

I claim as my invention:

1. A chuck combination comprising a collet having axially jaws extending from one end to grasp a burr, a rotatable hollow shaft for slidingly receiving the collet, said shaft having therein toward one end a recess of one diameter and adjacent said recess a second recess of a lesser diameter for guiding and urging radially inward the jaws of the collet and terminating at the opposite end in an apertured radially inwardly directed shoulder portion, collet captivating means in said one end of the hollow shaft and having an aperture therethrough to receive therein and guidingly support said burr, said jaws of the collet being spaced apart and having externally together a circumferential surface portion at one end of one diameter received in said first recess of the hollow shaft and the balance of the length thereof of a uniform lesser external diameter readily received and guided in said second recess of the hollow shaft, said collet jaws on the inside thereof having a tapered circumferential portion at said one end with the taper increasing in diameter toward said one end and an internal portion of a uniform diameter to receive, guide and grasp a burr when inserted in said chuck, said collet being slid axially within said hollow shaft when a burr is inserted and pushed therein whereupon said collet slides within said hollow shaft and the enlarged outer end thereof slides from within the first recess portion to the second recess smaller portion of the hollow shaft and the jaws are forced radially inwardly thereby to grasp said burr.

2. A chuck of the character described in claim 1 wherein the internal portion of uniform diameter in said collet extends from the end of the tapered portion for approximately the whole balance of the internal length of said collet.

References Cited in the file of this patent
UNITED STATES PATENTS

| | | |
|---|---|---|
| Re. 10,115 | Phillips | May 16, 1882 |
| 848,643 | Lehman | Apr. 2, 1907 |
| 849,208 | Crawford | Apr. 2, 1907 |
| 1,548,180 | Brown et al. | Aug. 4, 1925 |
| 2,378,720 | Nelson | June 19, 1945 |
| 2,833,546 | Johnson | May 6, 1958 |
| 2,917,829 | Page | Dec. 22, 1959 |